Patented Oct. 17, 1939

2,176,492

UNITED STATES PATENT OFFICE 2,176,492

CORROSION INHIBITOR

Louis J. Figg, Jr., and James W. Rhea, Kingsport, Tenn., assignors to Eastman Kodak Company, Rochester, N. Y., a corporation of New Jersey No Drawing. Application February 16, 1939, Serial No. 256,756

3 Claims. (Cl. 252—5)

This invention relates to anti-freeze compositions for automobile radiators, and more particularly to corrosion inhibitors for such anti-freeze compostions.

It is an object of this invention to provide an alcoholic anti-freeze composition which will not cause corrosion of the metal parts of automobile cooling systems. Other objects will hereinafter appear.

It is known that denatured alcohol and other substances commonly used in automobile radiator water for the prevention of freezing at low temperatures cause corrosion of the metal parts with which the radiator fluid comes in contact. It is also known to add sodium nitrite to anti-freeze compositions to inhibit corrosion. However, sodium nitrite, while preventing corrsion, by aqueous radiator fluids containing anti-freeze compositions, of most of the metals with which radiator fluids come in contact, causes or permits corrosion, by these fluids, of solder metal. A deposit is thus formed which tends to plug up the honeycomb sections of the cooling system, and eventually the solder seams open up.

We have discovered that the addition of butyl stearate together with sodium nitrite to an alcoholic anti-freeze composition prevents corrosion of metals, including solder metal, by aqueous radiator fluid containing the anti-freeze composition. In the term 'alcoholic anti-freeze composition" we mean to include not only anti-freeze compositions containing ethyl alcohol, but those containing other aliphatic alcohols, such, for instance, as methanol, glycols, glycerol, etc. The effect of the combination of sodium nitrite and butyl stearate is more than additive, since neither sodium nitrite nor butyl stearate alone entirely prevents corrosion.

An example of the testing of our novel corrosion inhibitor combination, under conditions at least as severe as those prevailing in an automobile radiator, is as follows:

Butyl stearate and sodium nitrite were added to a 25% alcoholic (aqueous) solution of completely denatured alcohol CDA No. 13, in the proportion of 0.25 cc. butyl stearate and 0.20 gr. sodium nitrite per 100 cc. of alcoholic solution. Pieces of copper, steel, brass, aluminum, iron and solder metal were tied together in a bundle, to facilitate electrolytic action, and partly immersed in the liquid, which was then refluxed continuously at 60–65° C. (140–150° F.). After seven days of refluxing, the liquid was a clear, amber color, and there was no corrosion of any of the metals.

When 0.50 cc. of butyl stearate per 100 cc. of alcoholic solution was used in place of the combination of butyl stearate and sodium nitrite, some corrosion had taken place at the end of seven days of refluxing.

It is, of course, desirable that our novel corrosion inhibitor be added to the anti-freeze composition before the latter is packaged for sale. In this case it also prevents corrosion of the iron drums, tin cans, or other containers in which the anti-freeze composition is packaged. The sodium nitrite may be dissolved in a little water before being added to the anti-freeze composition.

By the term "anti-freeze composition" in the claims, we mean to include anti-freeze compositions suitable for being added to automobile radiator water, and also aqueous radiator fluids containing such compositions.

It will be understood that we are not to be limited by the proportions of the above example. We may use from 0.10 to 0.75 gram of sodium nitrite and from 0.10 to 1.00 cc. of butyl stearate per 25 cc. of alcohol.

What we claim as our invention and desire to be secured by Letters Patent of the United States is:

1. An alcoholic anti-freeze composition containing, as a corrosion inhibitor, a mixture of sodium nitrite and butyl stearate.

2. An alcoholic anti-freeze composition containing, as a corrosion inhibitor, a mixture of sodium nitrite and butyl stearate in approximately the proportions of 0.20 gram of sodium nitrite and 0.25 cc. of butyl stearate per 25 cc. of alcohol.

3. An alcoholic anti-freeze composition containing, as a corrosion inhibitor, a mixture of sodium nitrite and butyl stearate in approximately the proportions of from 0.10 to 0.75 gram of sodium nitrite and from 0.10 to 1.00 cc. of butyl stearate per 25 cc. of alcohol.

LOUIS J. FIGG, JR.
JAMES W. RHEA.